Figure 1:
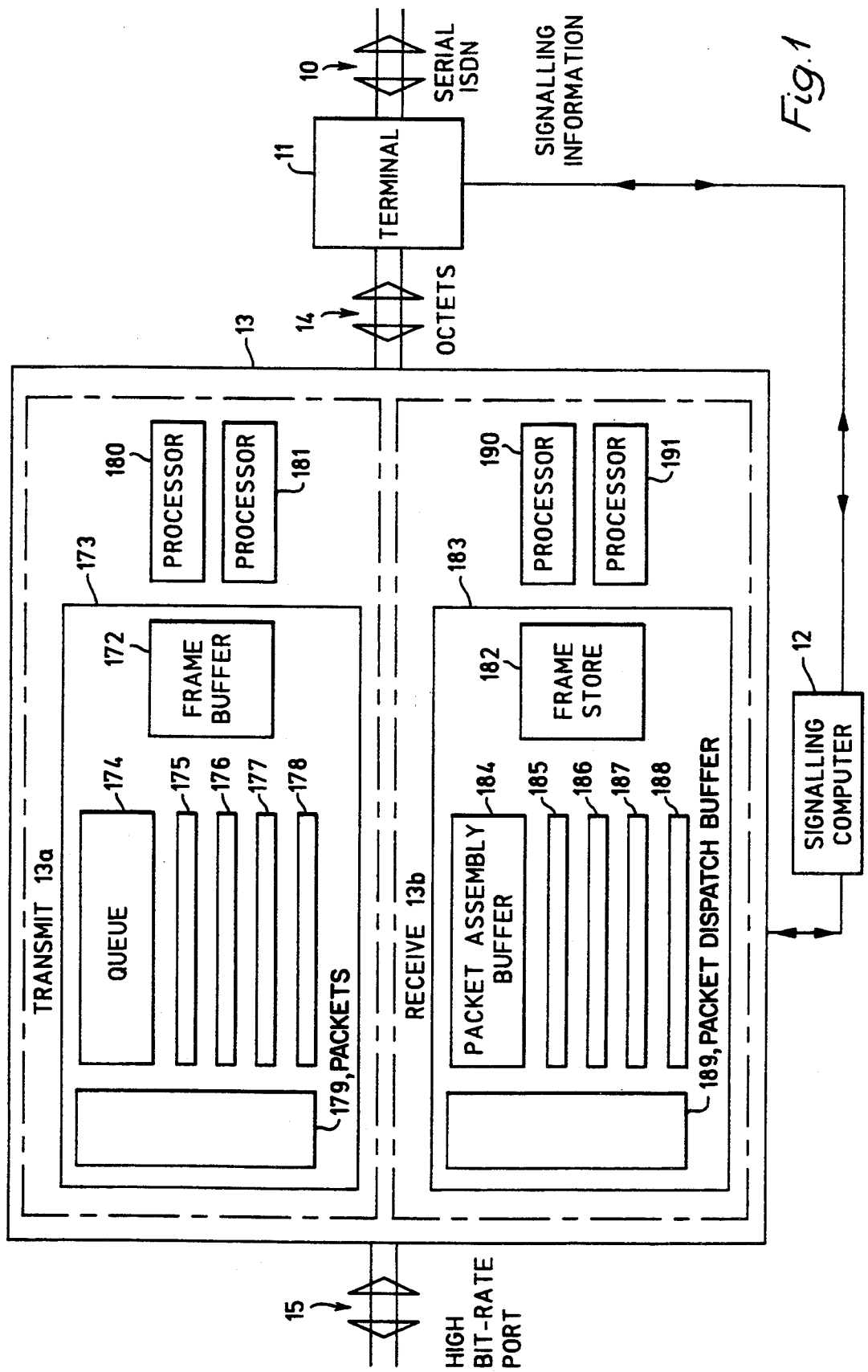

United States Patent [19]

Burren et al.

[11] Patent Number: 5,400,328
[45] Date of Patent: Mar. 21, 1995

[54] VARIABLE DATA RATE CHANNELS FOR DIGITAL NETWORKS

[75] Inventors: John W. Burren, Abingdon; Alan Pound, Leyton Buzzard, both of England

[73] Assignee: British Technology Group Ltd., London, England

[21] Appl. No.: 889,590

[22] Filed: May 28, 1992

Related U.S. Application Data

[63] Continuation-in-part of Ser. No. 887,021, May 22, 1992, Pat. No. 5,278,827.

[30] Foreign Application Priority Data

May 28, 1991 [GB] United Kingdom ............... 9111469
Jul. 17, 1991 [GB] United Kingdom ............... 9115405

[51] Int. Cl.$^6$ ............................................. H04J 3/16
[52] U.S. Cl. ........................................ 370/79; 370/24; 370/29; 370/84; 370/85.7; 370/95.1
[58] Field of Search ............... 370/24, 29, 79, 84, 370/85.7, 95.1

[56] References Cited

U.S. PATENT DOCUMENTS

| | | | |
|---|---|---|---|
| 4,750,168 | 6/1988 | Trevitt | 370/85 |
| 4,763,319 | 8/1988 | Rozenblit | 370/84 |
| 4,763,321 | 8/1988 | Calvignac et al. | 370/29 |
| 4,805,167 | 2/1989 | Leslie et al. | 370/84 |
| 4,809,270 | 2/1989 | Baxter et al. | 370/85.7 |
| 4,965,798 | 10/1990 | Mostafa et al. | 370/79 |
| 5,278,827 | 1/1994 | Pound | 370/84 |

FOREIGN PATENT DOCUMENTS

| | | | |
|---|---|---|---|
| 2196512 | 4/1988 | United Kingdom | H04J 3/16 |
| WO 12467 | 10/1990 | WIPO | H04L 25/14 |
| WO 14319 | 9/1991 | WIPO | H04J 3/16 |

OTHER PUBLICATIONS

WO 85/04300—Sep. 26, 1985.

*Primary Examiner*—Douglas W. Olms
*Assistant Examiner*—Russell Blum
*Attorney, Agent, or Firm*—Cushman, Darby & Cushman

[57] ABSTRACT

The Integrated Services Digital Network ("ISDN") normally uses 64 Kbits/sec channels which are therefore unsuitable for data traffic at higher rate traffic. This can be overcome by assembling ISDN channels to form higher bit rate channels. However, when the bit-rate required changes frequently, the number of channels grouped together must be changed often. To solve this problem, data packets are received from local area networks by a computer and assembled into groups of ISDN channels which are combined to form high bit rate channels or U-channels. The computer assembles data into an ISDN frame using an appropriate number of slots in the frame for each U-channel. The frames are transmitted using conventional ISDN circuits. On reception, ISDN slots in frames are passed to packet assembly buffers, one for each U-channel, before being passed to users. When a new slot is to be added to a U-channel, synchronization signals are sent in the new slot and flags are used to establish when data is to be sent. When the bit-rate of a U-channel is to be reduced by removing a slot, a distinctive closing sequence is sent in that channel which on reception is an indication that no further data will be sent in that slot.

18 Claims, 11 Drawing Sheets

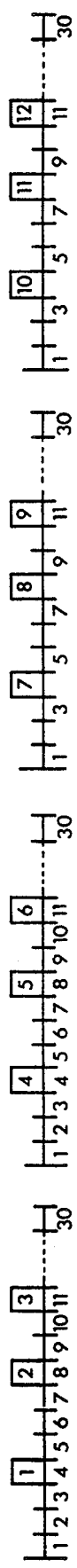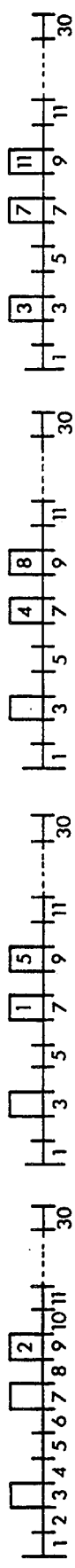
Fig. 5
Fig. 6

VARIABLE DATA RATE CHANNELS FOR DIGITAL NETWORKS

This is a continuation-in-part of application Ser. No. 07/887,021, to Pound, filed May 22, 1992, now U.S. Pat. No. 5,278,827.

The present invention relates to the provision of channels for digital networks, for example the Integrated Services Digital Network (ISDN), with bit rates which are both higher than the usual data-carrying channels of the networks and also variable.

The ISDN has been defined by the International Telegraph and Telephone Consultative Committee (CCITT) and the standards that have been recommended are based on the assumption that voice data, that is telephony, is one of the most important types of traffic that will be carried on the network. The standard means of converting an analogue voice signal to digital form is to sample the signal 8000 times per second, with each sample consisting of 8 bits of data. Thus the usual data-carrying channel in ISDN is a bidirectional channel carrying 64 Kbits/sec in each direction.

A "Primary Rate" bearer channel (the carrier) operating at 2048 Kbits/sec is also defined. This type of channel might be used for connecting a private 'branch' exchange to the network and is time division multiplexed into 32 sub-channels. Time division frames are made up of 32 octets of data, one octet (8 bits) from each sub-channel, and are sent in a continuous stream. In this specification the 32 positions in the time frame are called "slots". In each frame the first slot is used to identify the start of frame and another (known as the D channel) is reserved for providing the network with routing instructions. The remaining 30 slots (known as the B channels) may be used for data or digitised voice.

The primary rate channel carries 8000 frames per second and thus in order to send a 64 Kbits/sec signal through the system, it is split up into octets which are inserted into the same slot of successive frames.

A different ISDN is used in the USA where although 8000 frames per second are employed, a frame consists of 24 slots plus one start bit, giving a primary rate of 1544 Kbits/sec.

The data in a particular slot passes from its source to its destination through the network via one or more switching centres. At each of these centres data from any particular slot is extracted and placed in another slot in a frame travelling along the route to the destination. Octets placed in the same slot in successive frames leaving the source travel through the network in exactly the same fashion and arrive successively as the octets of a given slot in the frames arriving at the destination. However, the slot position within the carrier frame at the destination will not in general be the same as the slot position at the transmitter.

A disadvantage of the ISDN as described above, is that it is unsuitable for data traffic at higher rates than 64 Kbits/sec. This problem can be overcome to some extent by the system described in PCT Patent Specification WO 85/04300 where a group of 64 Kbits/sec data channels are assembled to form a channel having a higher bit-rate. The delay in each channel is monitored and then equalising delays are added in the channels so that data distributed in sequence over the channels on transmission is assembled in the same sequence on reception. However the system relies on setting up the group of channels as a whole and cannot be changed without being completely reset.

Where the high bit-rate channel is to be used for the transmission of data packets the bit-rate required between locations is likely to change frequently and therefore the number of channels grouped together must be changed often.

In this specification a bit-synchronised digital data network is a network which provides transmission channels between two, or any two of three or more, locations at predetermined bit-rates, each channel being established before transmission, and not by reference to information transmitted in the channel. The network maintains a frequency that is the same for all channels and is synchronised between all channels. Within one period of this frequency a channel which is carrying data accepts a predetermined number of bits at one location and delivers the same number of bits at another location.

The proposed ISDN standards define a network of this type in which the said frequency is 8-kilohertz and for this reason is said to have 8-kilohertz integrity. For two channels in a bit-synchronised digital data network having the same end-points the signal delay across the network may be different for the two channels, but, in any given number of periods of the basic frequency, exactly the same number of bits are delivered on the two channels.

British Patent No. 2,196,512 and U.S. Pat. No. 4,805,167 describe methods and apparatus for use with an ISDN in which a variable number of slots are combined together to provide channels, known as U-channels, which have bit rates higher than those of the ISDN slots, these bit rates being variable by varying the number of slots combined to form one U-channel. The number of slots in any U-channel is varied as required by traffic requirements without interrupting traffic in the U-channel by the use of synchronisation signals which are transmitted by a U-channel at regular intervals. The synchronisation signals are used to signal the opening or closing of slots in a U-channel and to provide synchronisation for data in a new slot. However such an arrangement has the disadvantage that the overall data carrying capacity of the channels forming a U-channel is reduced by the regular transmission of synchronisation signals and in addition problems may occur in the synchronisation of ISDN circuits which employ the U-channel technique.

According to a first aspect of the present invention there is provided a method of varying the bit-rate available for digital signals to be transmitted by a communication system which employs a plurality of first fixed bit-rate channels, comprising the steps of opening for operation between two stations a variable bit-rate second channel comprising at least one of the first channels, and changing, as required in the course of operation, the number of first channels comprising the second channel while continuing to transmit data over the second channel, wherein the number of first channels forming the second channel is reduced, when required, by transmitting, in the second channel, a predetermined distinctive sequence of digital signals from one of the two stations, the predetermined distinctive sequence being one which is not likely to occur in data to be transmitted by the communication system, ceasing to transmit data in one of the first channels which is to be removed from the second channel at a time having a first predetermined relationship to the transmission of the predetermined distinctive sequence, and at the said other station, omitting, at a time having a second predetermined relationship to the reception of the predetermined distinctive sequence, any data received in the said one first channel from the output of the second channel.

The first channels may be slots of an ISDN and the channels are then duplex and the first and second channels are transmitted in a series of frames.

The use of the predetermined sequence allows the regular transmission of synchronisation signals to be omitted. In one embodiment of the invention the system used is similar to that described in the above mentioned British and U.S. patents in that stations at each end of a U-channel generate a signal indicating when synchronisation signals would have occurred and carry out procedures at these times to detect the said predetermined sequence. In another embodiment of the invention the predetermined sequence can be sent in any ISDN frame and each slot of each U-channel is examined at the receiving end for the presence of the predetermined sequence.

The predetermined distinctive sequence is specially chosen, as mentioned above, so that it is extremely unlikely to occur in practice, and should, for example in ISDN, have at least about 48 bits but preferably 64 bits or 64 bytes so that the probability of this sequence occurring in normal traffic is extremely low. In general, the probability of the sequence occurring in normal traffic should be, for example, of the order of once in a hundred years but preferably once in a thousand years or more.

At first sight it would be expected that the sending of the predetermined sequence would reduce the bit-rate of the U-channel (that is the second channel) but although strictly speaking such a reduction occurs it does not present a problem since when a slot is removed from a U-channel it is because the bit-rate of the U-channel is to be reduced.

In both embodiments synchronisation signals, in the form of other predetermined sequences of digital signals, are used to open U-channels and to signal states of slots, for example when not carrying data, that is when idle.

According to a second embodiment of the invention there is provided apparatus for use in transmitting and receiving variable bit-rate digital signals, comprising means for operating a plurality of fixed bit-rate first duplex channels at a first location for communication to a second location, means for combining a variable number of the first channels to provide a variable bit-rate second channel, and means for changing the number of first channel s forming the second channel as required in the course of operation, comprising means for transmitting a predetermined distinctive sequence of digital signals from the first location when the number of first channels forming a second channel is to be reduced, the predetermined distinctive sequence being one which is not likely to occur in data to be transmitted by the second channel, and means for detecting the predetermined distinctive sequence when received from the second location, the means for combining the first channels being arranged to cease to transmit data in one of the first channels which is to be removed from the second channel at a time having a first predetermined relationship to the transmission of the predetermined distinctive sequence and to omit, at a time having a second predetermined relationship to the reception of the predetermined distinctive sequence, any data received in the said one first channel from the output of the second channel.

Preferably the various means of the second aspect of the invention are formed by a programmed computer, such as a microprocessor and/or personal computer (PC).

When the first and second channels are transmitted in a series of frames, the first predetermined relationship may be that transmission ceases in the said one first channel at the next frame. As an alternative, where a signal is generated indicating when synchronisation signals would have occurred, the first predetermined relationship may be that transmission ceases in the said one first channel at the frame following the next synchronisation time after the special sequence is received. The second predetemined relationship may be that data from the said one first channel is omitted from the output of the second channel at the next frame after the special sequence is received. As an alternative, where a signal is generated indicating when synchronisation signals would have occurred, the second predetermined relationship may be that data from the said one first channel is omitted from the output of the second channel at the frame following the next synchronisation time after the special sequence is received.

Figure 2:
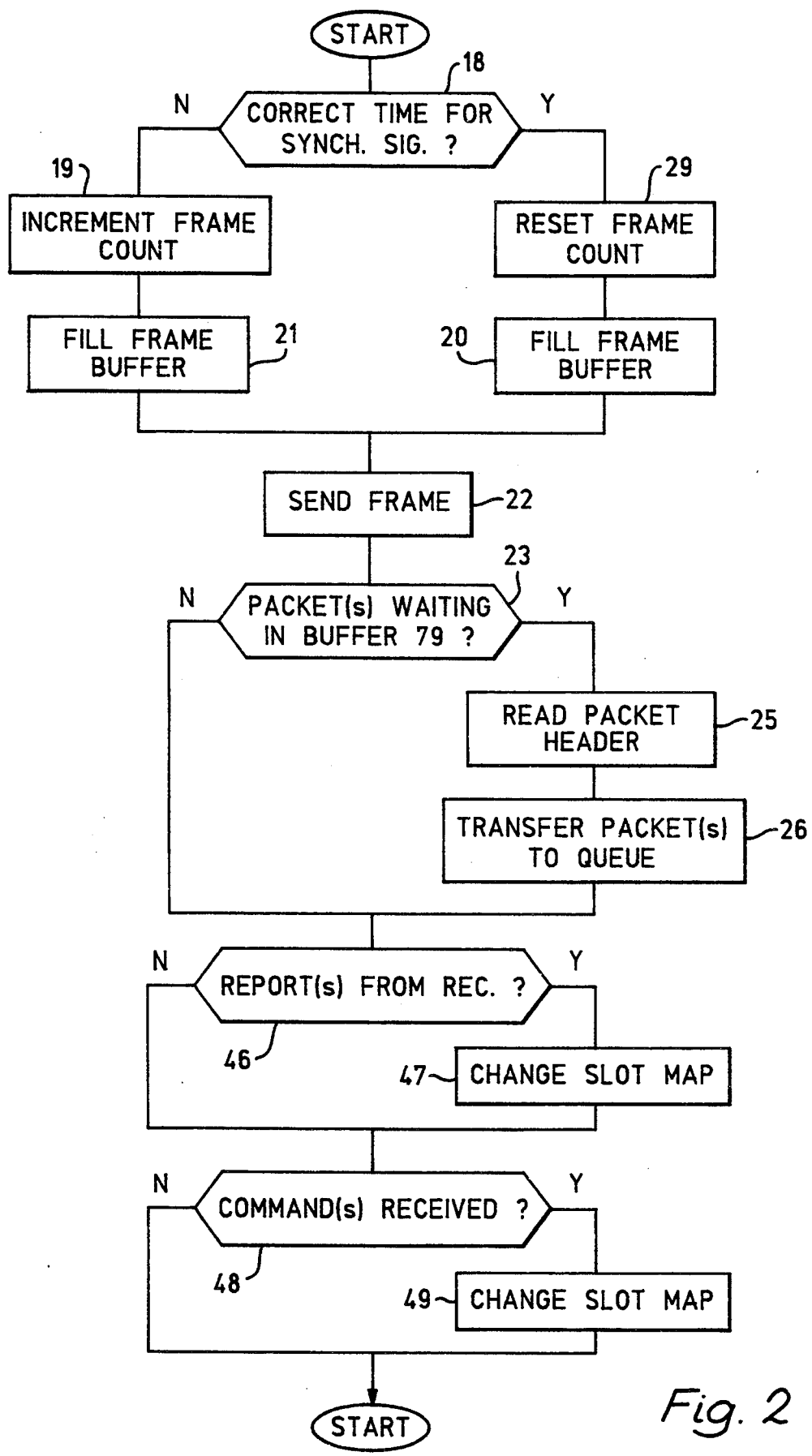
Figure 3:
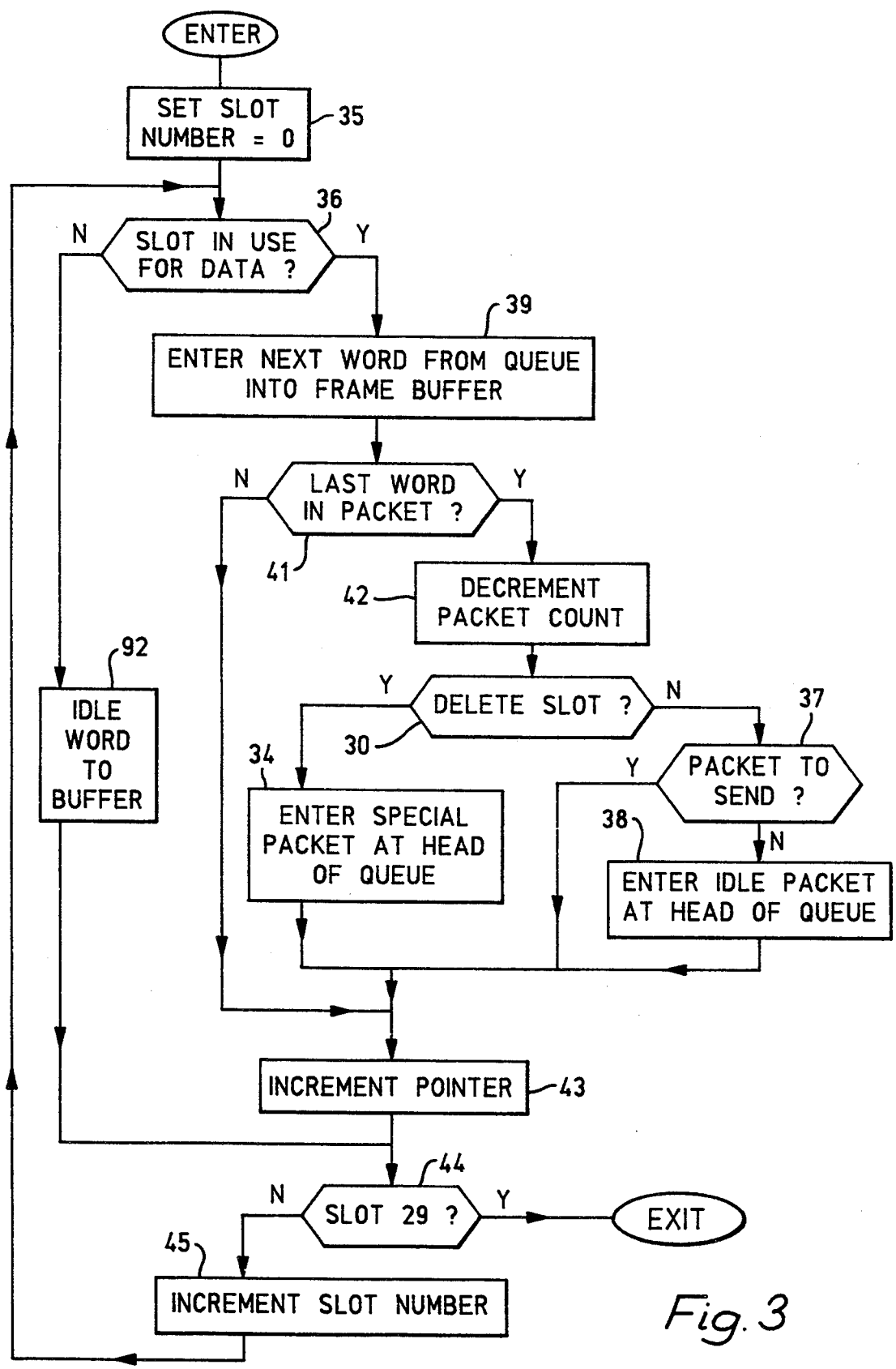
Figure 4:
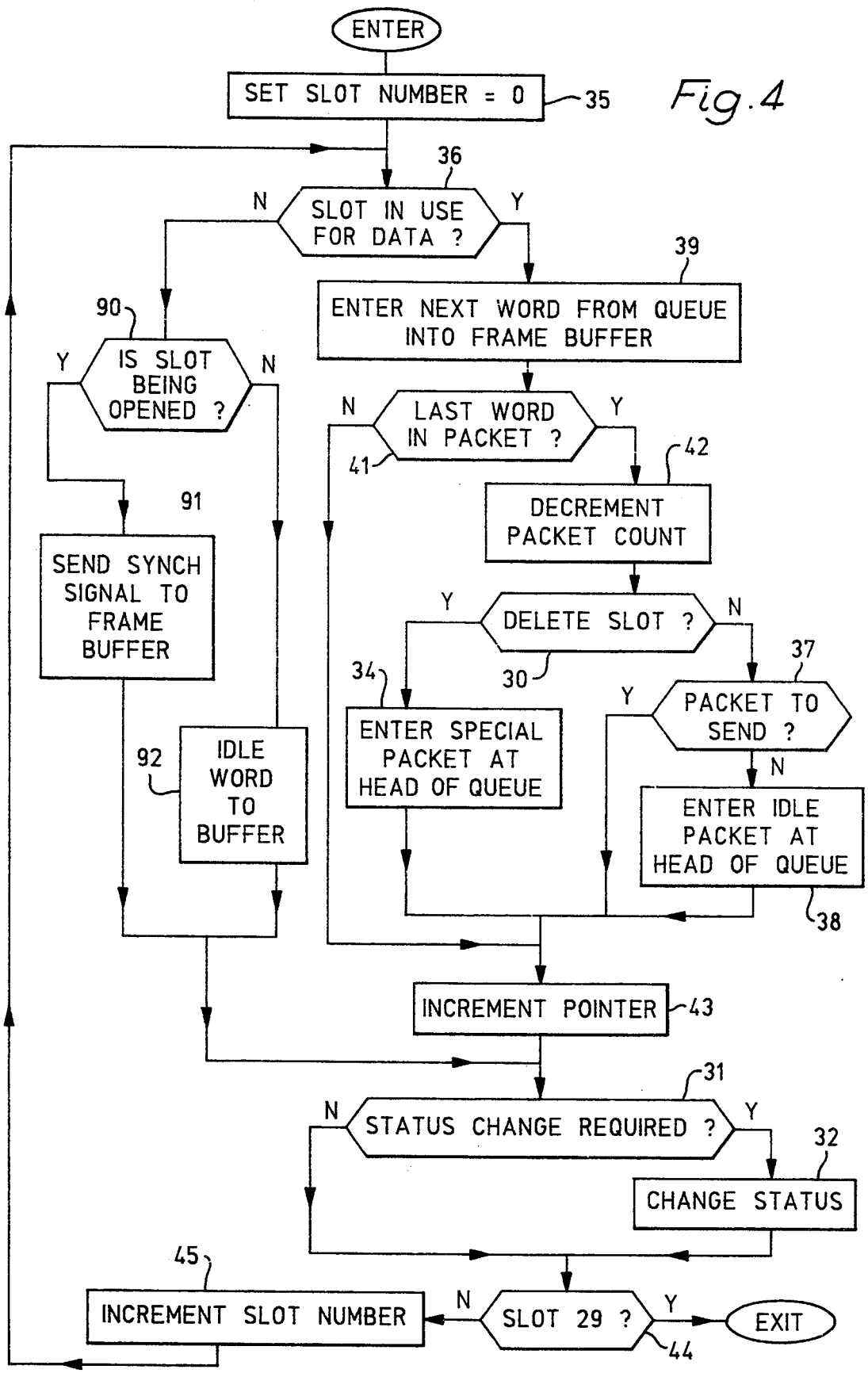
Figure 7:
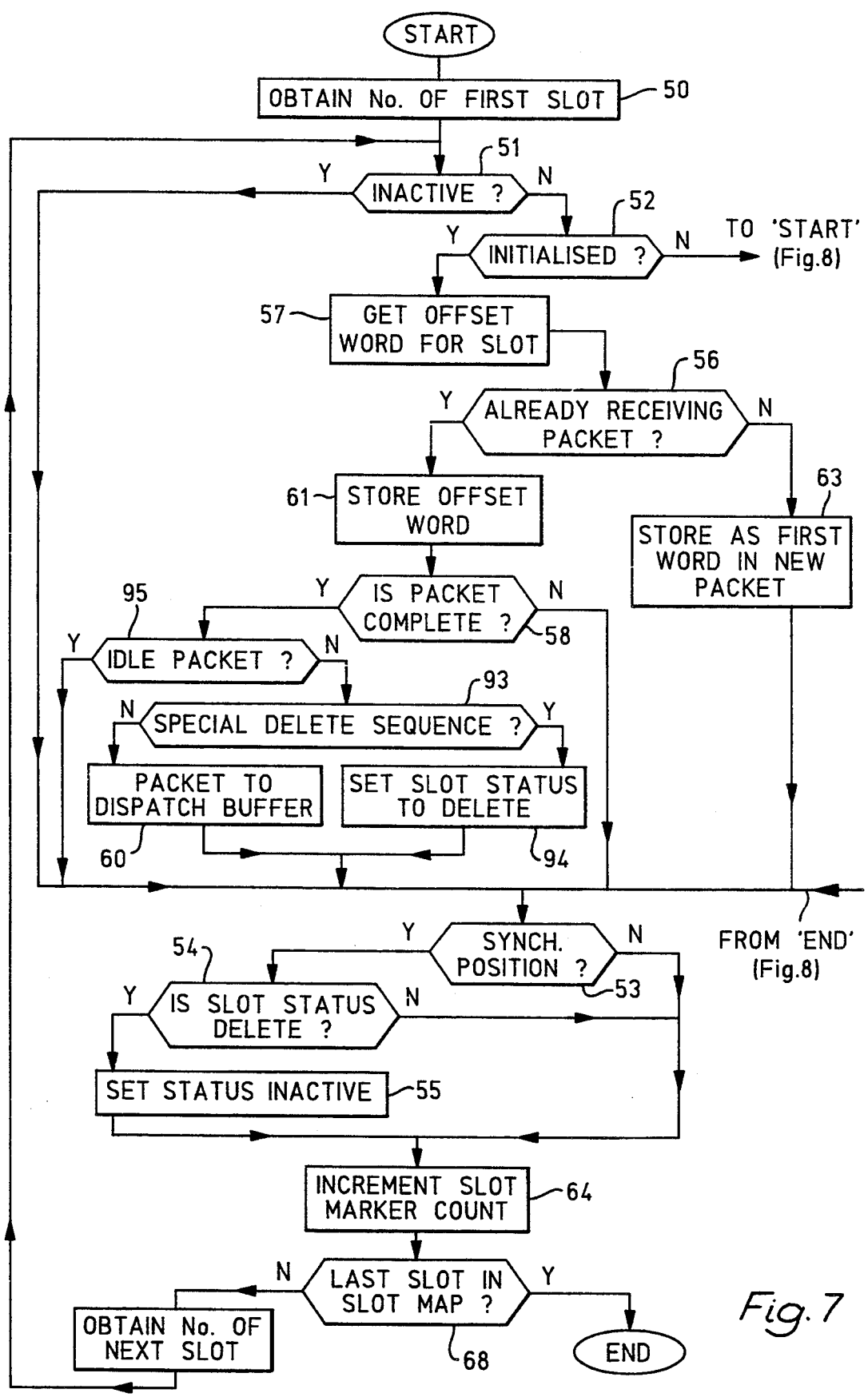
Figure 8:
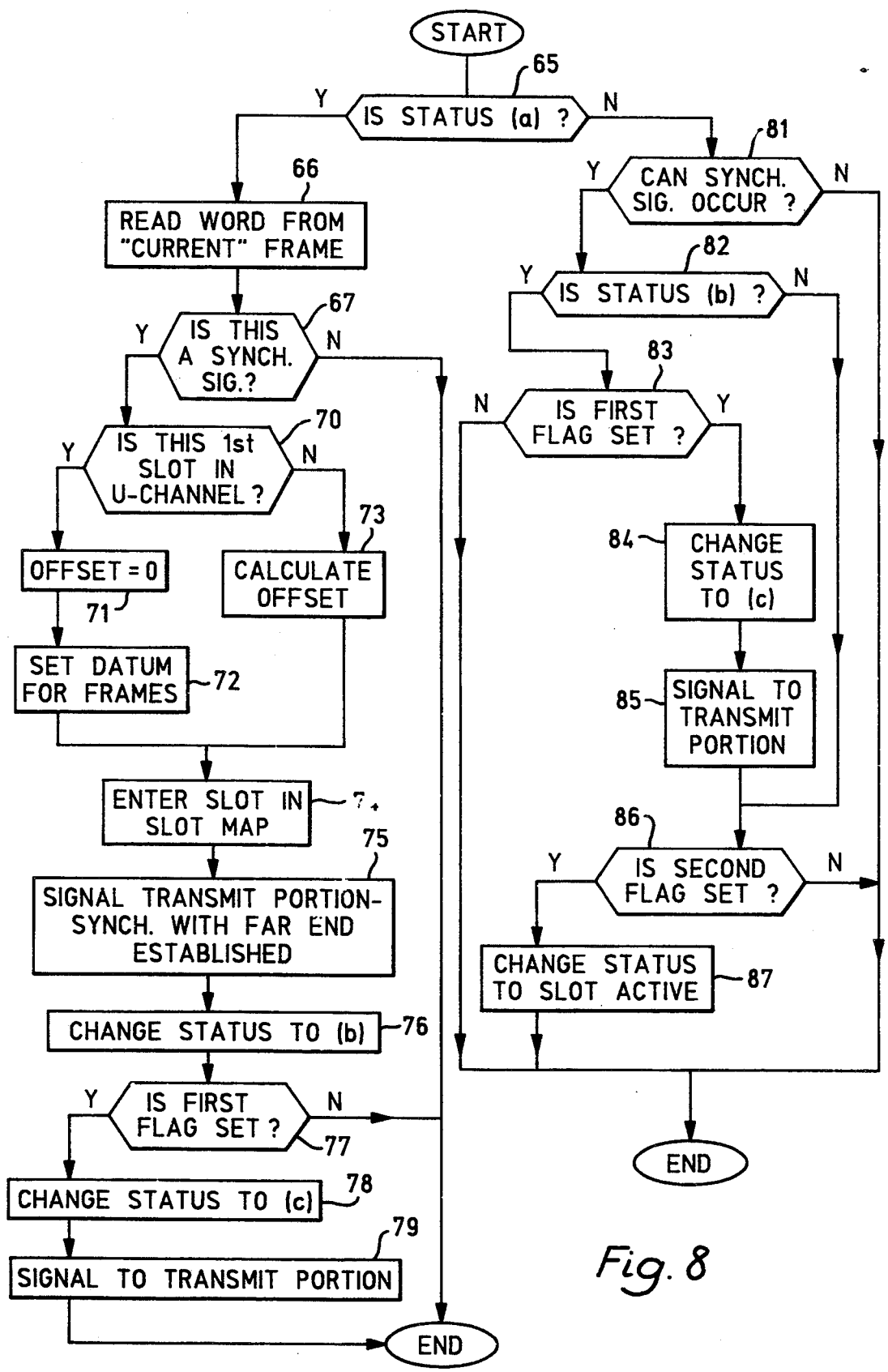
Figure 9:
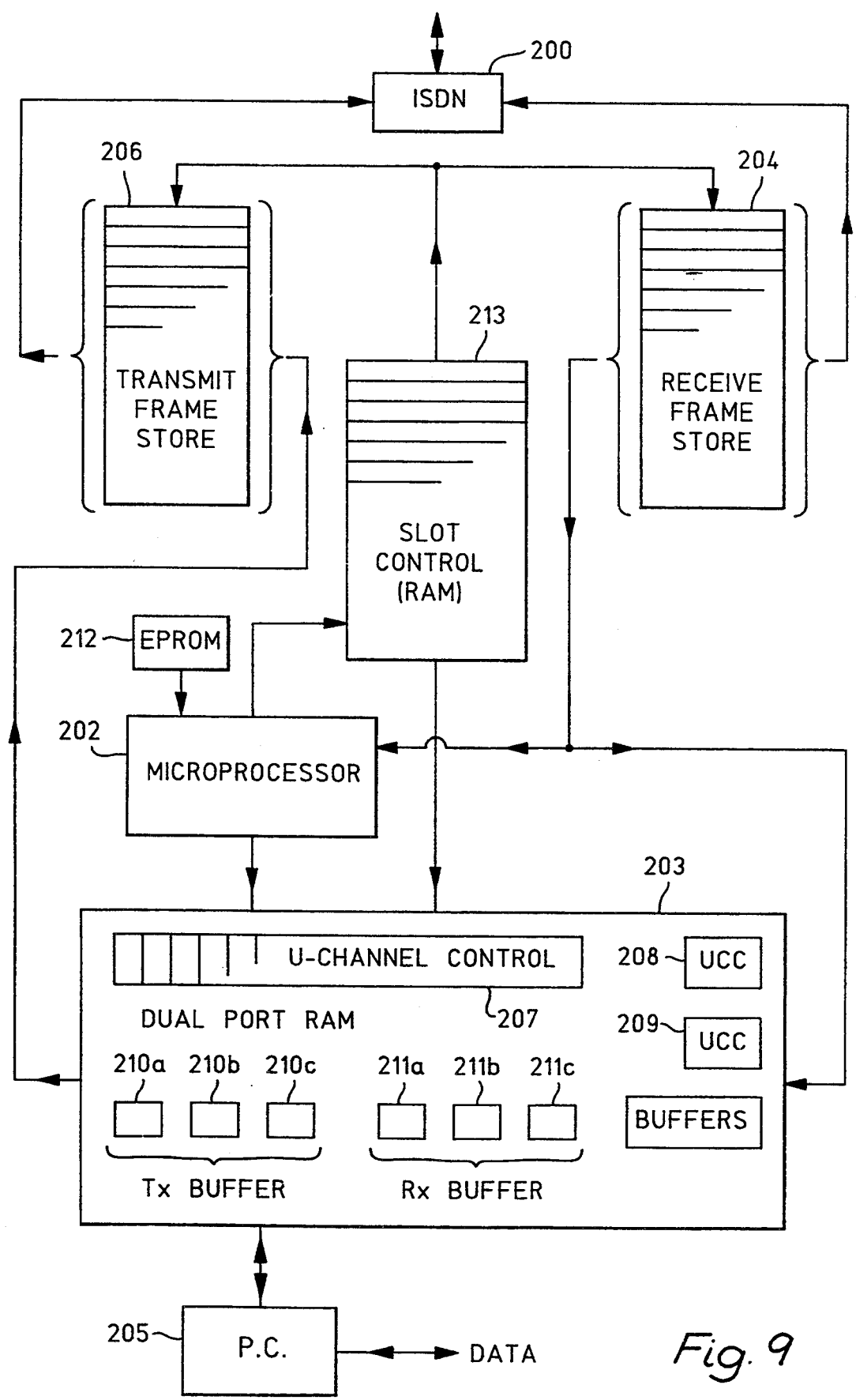
Figure 10:
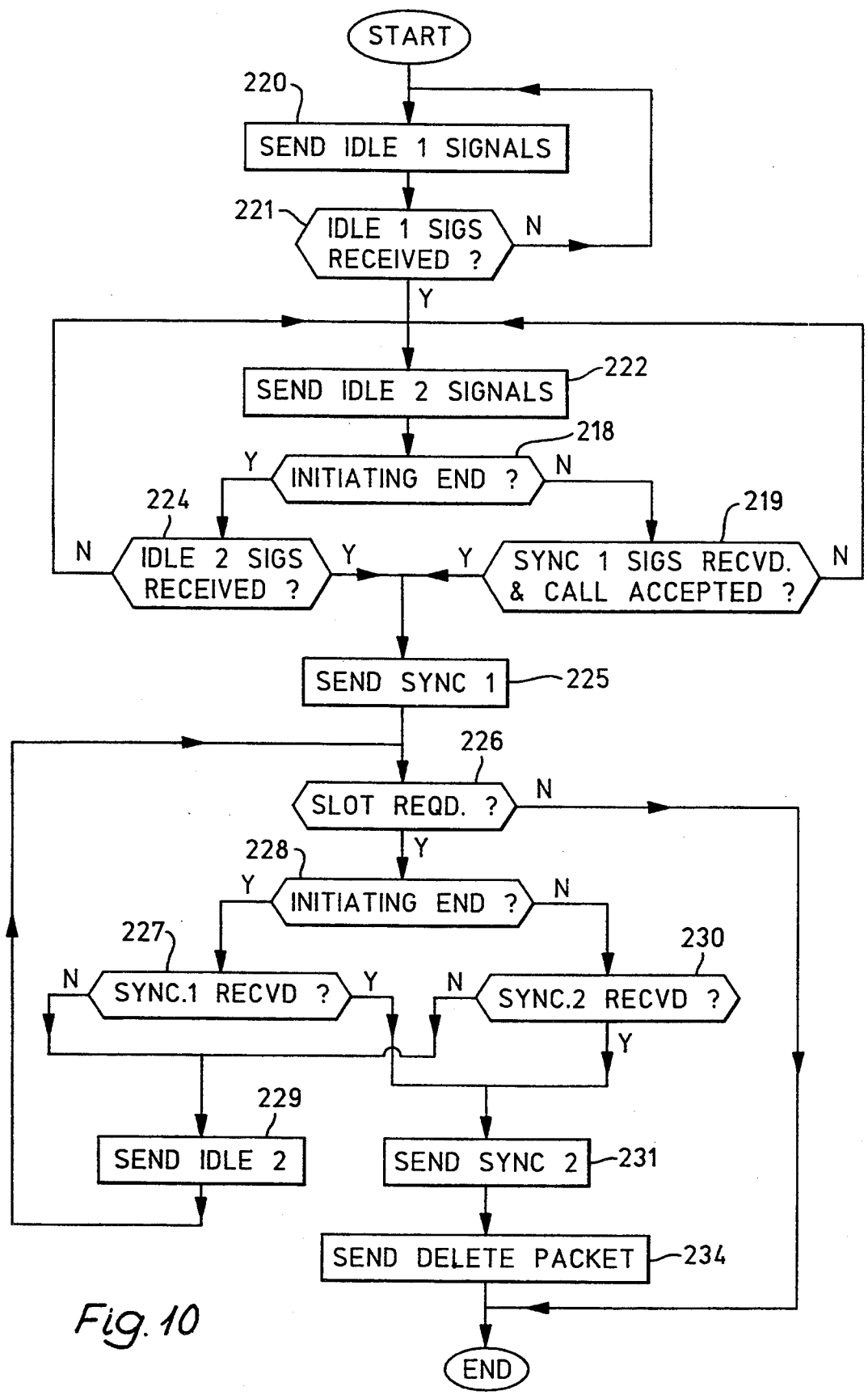
Figure 11:
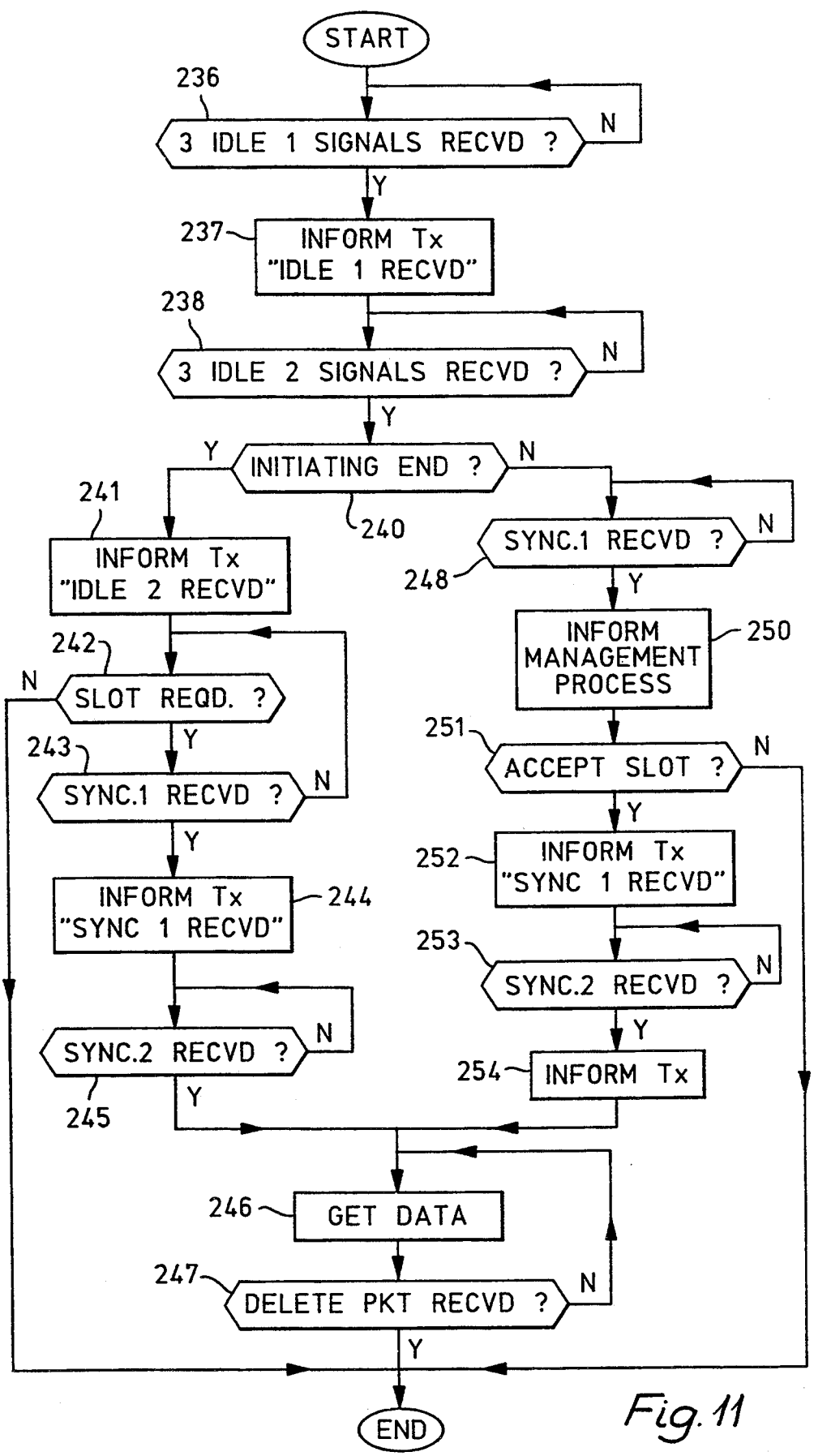
Figure 12:
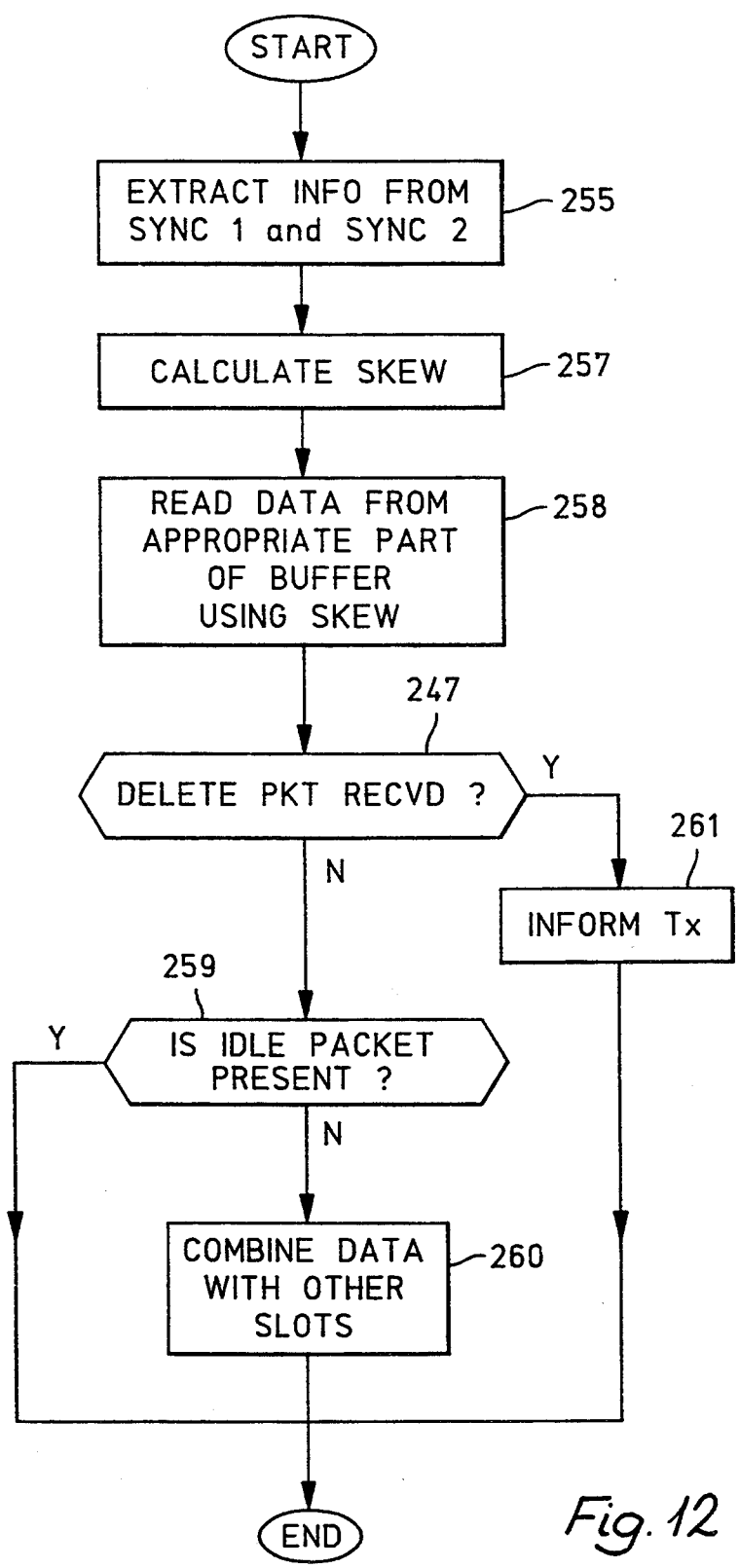

The invention will now be described by way of example with reference to the accompanying drawings, in which:

FIG. 1 is a block diagram including apparatus according to the second aspect of the present invention, FIG. 2 shows a flow diagram used in explaining the operation of the computer 13 of FIG. 1 on transmission, FIG. 3 is a flow diagram showing an operation 21 of FIG. 2 in more detail, FIG. 4 is a flow diagram showing an operation 20 of FIG. 2 in more detail, FIGS. 5 and 6 show how time slots used in operating the invention may change order during transmission, FIGS. 7 and 8 form a flow diagram showing the operation of the computer 13 of FIG. 1 on reception, FIG. 9 is a block diagram including apparatus of another embodiment of the second aspect of the invention, and FIGS. 10, 11 and 12 are flow diagrams used in explaining the operation of the microprocessor 202 of FIG. 9.

In FIG. 1 a bidirectional serial digital link 10 forming part of an ISDN is connected to a terminal 11 of known construction conforming to the ISDN standards. In operation the terminal 11 requests through paths for 64 Kbits/sec channels (that is slots) through the ISDN network (which includes switching centres) to similar terminals at remote locations. Information for requesting through connections is supplied to the terminal 11 by a signalling computer 12, which may conveniently be a microprocessor, and routing and destination information is entered into the D channel of the ISDN frame described above. The ISDN link, via the D channel extracted by the terminal 11, also supplies the computer 12 with information identifying incoming channels, that is channels whose initiation has been carried out at the remote end. The terminal 11 has complete control over the allocation of channels to slots in every ISDN frame which it transmits over the link 10 but, as mentioned above, when the slot frames reach switching centres, the frames are usually divided so that slots in a single incoming frame may be transmitted from the switching centre in different frames to different destinations. Even where several slots in a single frame from a single terminal are to be transmitted to the same destination the signals in the slots may travel by various routes and may experience relative delays which cause the slots to arrive at the destination in a different order from that in which they were transmitted from the originating terminal. However, on reception, information is sent in the D channel giving the allocation of slots to channels and thus although slot position is, in general, different from that used on transmission, a particular slot position is known to belong to a certain channel.

A further computer 13 is connected by way of a bidirectional interface 14 to those connections of the terminal 11 which are assigned to receive signals for insertion in the slots and which are assigned to transmit signals received in the slots. In the present example the computer 13 transmits and receives data signals to and from a local area network, primarily for passing data between computers (for example a Cambridge Ring or Ethernet) by way of a variable rate bidirectional digital input/output port 15 connected to a further computer (not shown) which is itself connected to the network. In general the bit-rate in the port 15 is higher than that in a slot of the ISDN system.

The local area networks transmit packets comprising groups of octets of data bits. Each packet begins with an octet indicating the start of a packet and the packet length is usually delineated in some way, for example as specified by the content of octets following the start octet. The packet also contains information on its destination. Octets which contain no information (idle octets) may be sent between packets but they must be different from start octets. Idle octets have a characteristic bit pattern which may be the same as an information octet, the difference between data and idle signals being determined by whether the octet is inside a package or not.

The computer 13 receives packets over the port 15 and for transmission sorts the packets out according to destination and applies them to the terminal 11 in such a way that the information contained is passed along a number of unrelated slots thus allowing each packet to have a higher bit rate than a single slot. Each slot also carries synchronisation signals at fixed intervals when it is being brought into use which allow the slots to be assembled in the correct order by a similar arrangement to that of FIG. 1 but at a remote location. Thus the computer 13 at the remote location assembles packets received and passes them by way of its port 15 and the local area network to their destination, synchronisation signals are not sent when there is no change in the number of slots in use.

The computer 13 must function at high speed in view of the high bit-rate of the ISDN system. For this reason it may comprise a number of INMOS Transputers type IMS T414 or T800; for example two transputers may form a computer portion 13a which is for transmission and two further transputers may form another computer portion 13b for reception. Each transputer has four 10 Mbits/sec duplex serial links providing concurrent message passing capability. These links may be used to interconnect the transputers and to connect to the interface 14, the port 15, and the signalling computer 12. For example as shown in FIG. 1, processors 180 and 190 use store areas 173 and 183 and processors 181 and 191 pass data octets to and from the interface 14, each of these processors being one transputer.

Since transputers can handle a word of 32 bits almost as quickly as a single octet, the computer 13 handles the data in words of four octets and the transputer 181 on the transmit side and the transputer 191 on the receive side form the words into octets and the octets into words, respectively.

On the transmit side a frame of thirty words is generated and the transputer 181 generates four frames of octets by first taking the first byte from each word, then the second byte from each word and so on.

Since, in this example, the data is handled in words, idle packets, rather than idle octets, each formed from, for example, ten words are used. These packets have a form which makes it possible for the receiver to establish which byte in the octets received is the first byte in a packet; thus the idle packet may have the form: byte 1—all zeros, bytes 2, 3 and 4—all ones.

On the receive side the corresponding transputer 191 receives frames of octets and converts these to frames of words. For each slot, when use of the slot is initiated, the transputer 191 establishes which byte is the first byte of the words. This it does by ensuring that the idle packet is received correctly.

In describing the operation of FIG. 1 further, data is considered as being in "words" but it must be understood that such a process as has just been described converts to and from frames of octets.

In FIG. 1, packets are divided into groups according to destination and each group is formed into a high bit-rate signal which is transmitted simultaneously with the other high bit-rate signals.

Each high bit-rate signal is considered as being transmitted by what is known in this specification as a U-channel which uses a number of ISDN slots which together give the required bit-rate. The U-channels are assembled in the ISDN frames by the computer 13 so that each ISDN frame contains intervals of all the high bit rate signals. The 30 available slots of an ISDN primary rate channel may be divided into U-channels in any way consistent with the total number of slots used being less than or equal to 30, i.e. there may be a single U-channel with 30 slots or at the other extreme there may be 30 U-channels each with one slot. In the example presented here the case with five active U-channels will be considered.

The ISDN slots are used in a duplex fashion with transmission and reception for any one slot being between the same two locations. In general each such slot is not in the same position in the ISDN frame at each of these locations.

The process of setting up U-channels and changing the number of U-channels in use is a continuous one in the sense that changes can be made at any time. Initially a command is sent to set up a U-channel to a given location and this command is implemented in the way which is now briefly described and whose operation can be seen in more detail in the flow charts of FIGS. 2, 3, 4, 7 and 8. Commands are generated externally according to traffic requirements and are usually generated by a computer (or possibly an operator) carrying out management functions.

When a new U-channel is to be initiated between two locations or another slot is to be added to an existing U-channel, both the near and far ends receive instructions from the respective signalling computer 12 that a certain ISDN slot is to be used. Both ends then send synchronisation signals at intervals in that slot. Slots carry distinctive "idle" signals when not in use so when the synchronisation signals are first sent they are sent at intervals with relatively long intervals of idle signals between them. Since the near and far ends are not, in general, synchronised this process usually starts at one end before the other. When, for example, the far end receives synchronisation signals in the slot, it transmits a first synchronisation flag and when this first flag is received at the near end it is a signal that the channel is synchronised and data can be sent. Thus on receiving the first flag the near end sends a second data flag followed immediately by data in the appropriate slot. When the slot is to be removed from a U-channel or a U-channel is closed down by closing its slots then the two ends transmit a special 64-bit distinctive closing sequence at the beginning of a packet in that U-channel which also contains the number of the slot to be closed. Thus, on recognition at the receiving end, this packet indicates the slot to be closed and that no further data will be sent in that slot.

The store area 173 contains a frame buffer 172 and holds words for ISDN slots making up a single ISDN frame. The processor 180 executes the flow chart of FIG. 2 repeatedly, once for every frame to fill the frames. A test 18 is first carried out to determine whether it is the correct time to insert synchronisation signals into a slot if that slot is to be initiated. Such signals may only be inserted at times separated by regular intervals, say every 100 or 200 new frames during initiation, and the test 18 is carried out by determining whether an ISDN count has reached the interval limit (for example 100). The ISDN count is held as a frame count and if the count indicates that it is not the correct time for a synchronisation signal the frame count is incremented by one in an operation 19 but if it is the correct time for such a signal, then the frame count is reset (operation 29). Then data from five queue areas 174 to 178 in the memory of the computer 13 which, as will be explained, hold sorted data from incoming packets, and correspond to the five U-channels, are used in an operation 20 or 21 (depending on the result of the test 18) to fill a buffer 172 in locations corresponding to ISDN slots. When the slots for all the U-channels have been filled and the slots not in use for U-channels have been filled with words which form one or more idle packets the contents of the buffer 172 are sent in an operation 22 to the terminal 11 by means of one of the transputer links allocated for transmission as mentioned above.

In general the number of U-channels in use can, as mentioned above, vary from 0 to 30 so the number of queues is also variable.

The alternative operations 20 and 21 of filling the slots in the ISDN buffer for each U-channel are now described and in order to carry out one of these operations the flow chart of FIG. 3 or FIG. 4 is completed from enter to exit once for each frame. The U-channel to which each ISDN slot is allocated is stored in an array known as "slot map", an example of which is given in Table 1. Only part of a slot map is shown and the numbering of the ISDN slots refers to the slots available for transmission, not the actual ISDN numbering.

TABLE 1

| ISDN slot number | 0 | 1 | 2 | 3 | ——— | 27 | 28 | 29 |
|---|---|---|---|---|---|---|---|---|
| U channel | | X | X | 5 | 4 | ——— | 5 | 3 | 2 |
| Status | | 1 | 1 | 4 | 5 | ——— | 4 | 3 | 4 |

[Note: X indicates not in use]
The status of each channel is coded as follows:
1) Not in use.
2) Allocated to U-channel, but far end has not indicated that it has locked on to synchronisation signal.
3) Allocated to U-channel, far end has indicated that it has locked on to synchronisation signal, but not yet in use for data.
4) Allocated to U-channel and in use for data.
5) Allocated to U-channel and in use for data, but should be removed from U-channel at the next correct time for a synchronisation signal.

In the first operation 35 of FIG. 3, carried out if it is not the correct time for entering synchronisation signals, a slot number count is set to zero and then a test 36 is carried out to determine from the slot map whether a slot is in use for data. If it is not, an "idle" word is entered into the frame buffer 172 (operation 92). If the test 36 indicates that the slot is in use for data then the next word from the queue for that U-channel is entered into the frame buffer (operation 39). Next a test 41 determines whether the word just entered is the last word in a packet and if so a count specifying the number of packets in the queue is decremented (operation 42). It may be that a slot has been indicated as no longer being required either because a U-channel is to be closed or the bit-rate of such a channel is to be reduced. For this purpose, a test 30 interrogates Table 1 to determine if a slot has status 5 and is to be deleted and if so then the special distinctive 64-bit closing sequence is placed within a packet, which also contains information identifying the slot, and the packet is inserted at the head of the queue (operation 34) for the U-channel which contains the slot to be deleted. When this distinctive sequence is received by the receiver it is an indication that no more data will be sent by the deleted slot in the U-channel that contained that sot so packets must, from the time when synchronisation signals could next be received, be formed without data from that slot (assuming that the whole U-channel is not being closed down). If the test 30 indicates that no slot deletion is required, a test 37 is carried out to determine whether there is a packet in the appropriate queue to send and if not an idle packet is entered at the head of the queue (operation 38). It is now necessary to increment a pointer indicating the position of the next word in the queue and this is carried out in an operation 43. In this operation it may be necessary to move the pointer to the start of the next packet.

Following either of the operations 37 or 43, a test 44 determines whether FIG. 3 has been traversed for all slots in the frame. If not the slot number is incremented (operation 45) and a loop back to the test 36 occurs. Otherwise there is a return to a test 23 in FIG. 2.

The flow chart of FIG. 4 is executed instead of that of FIG. 3 if the current time is one at which synchronisation signals could be entered. The operation 35 is carried out as in FIG. 3 followed by the test 36 which determines from Table 1 whether the slot has status 4 or 5 and is in use for data and if so the operations and tests 30, 34, 37 to 39 and 41 to 43 are carried out as in FIG. 3. If the s lot is not in use for data a test 90 determines from Table 1 whether the slot is in the process of being opened and if so the appropriate synchronisation signal is sent to the frame buffer (operation 91). If the test 90 is negative an idle word is sent to the frame buffer (operation 92).

After any of the operations 43, 91 or 92, a test 31 is carried out to determine from the results of previous tests 46 and 48, and operations 47 and 49 (described below) whether the status of the slot in Table 1 should be changed to status 1 in an operation 32. If such a change is made then the test 36 in FIG. 3 will reflect this change in the next frame sent. Reverting to FIG. 4 the test 44 is now carried out followed, if appropriate, by the test 45 with a jump back to the test 36.

The next part of the flow chart of FIG. 2 is concerned with storing packet signals from the port 15 and preparing them for filling U-channels. A portion 179 of the store of the computer 13 is allocated to hold packets received by way of the port 15. A test 23 determines whether any packets waiting for sorting are held in the store portion 179 and if so an operation 25 is carried out in which the packet header is read, and then the packet is transferred using the header to the appropriate queue and a pointer for the portion 179 is adjusted (operation 26).

Next a test 46 checks whether the processor of the computer 13b has received an indication that a change in the status of slots in the slot map is required, such as is received if the special closing packet has been received (see a test 93 in FIG. 7). If so the status of the appropriate slots in the slot map is changed to 5 in an operation 47. Next a check 48 is carried out to determine whether a command has been received to add or delete a slot from one of the U-channels. If so the status of the slot map is changed to 5 in an operation 49. The results of the tests 46 and 48 and the operations 47 and 49 determine whether the allocation of ISDN slots to U-channels has changed since the previous transmission of the synchronisation pattern. This information is supplied by the computer 12 as a result of changes in the ISDN slots which are to be used as indicated by the ISDN network in response to requests made by the signalling computer. For example, if a new U-channel is to be set up to transmit packets to a new destination then a new slot arrangement (that is a new slot map) is required. A new slot map is also needed if changes in bit rate for U-channels require a change in the number of ISDN slots needed for that channel.

Table 2 shows an example, for slots 15 to 18, of the synchronisation signals which are sent at the appropriate time, as explained above, when a slot is to be opened.

TABLE 2

| ISDN slot position | Data carried in a synchronisation frame | | | |
|---|---|---|---|---|
| | 1st octet | 2nd octet | 3rd octet | 4th octet |
| 15 | X | 15 | Y | 11 |
| 16 | X | 16 | Y | 10 |
| 17 | X | 17 | Y | 11 |
| 18 | X | 18 | Y | 00 |

The numbers in column 3 indicate the transmitting slot position which allows the receiver to establish how data in the receive slots should be rearranged in order to preserve the sequence of data. The last column contains a first flag in the form of a first bit indicating whether a slot is in use and a second in the form of a second bit indicating whether a slot is synchronised. In this example the flags show that the slots 15 and 17 are in use, in synchronism; the slot 16 is in synchronism but not yet in use; and the slot 18 is not in use. X and Y are two fixed octet values, which are chosen to allow synchronisation signals to be distinguished from idle words. The operations 47 and 49 update the slot map for the current slot. While U-channels and individual slots are being initiated, synchronisation signals are sent each time the above mentioned interval limit is reached. Synchronisation signals pertaining to a particular U-channel are received at the destination of this U-channel, where the information is used to re-assemble the data received on that U-channel into the correct sequence of words.

For reception, the transputer 190 uses a storage area 183 allocated to contain a buffer area 182 which holds a number of received frames, a set of packet assembly buffers 184 to 188, one for each U-channel and a packet dispatch buffer 189 where complete received packets await dispatch to their ultimate destination via the port 15.

The data carried in the ISDN slots which arrive at the terminal 11 are passed to the computer 13 and placed as complete frames of thirty words in the buffer 182. A number of such frames, for example five, are held at a time. Indications of the associations between receive slots and originating locations are received by the computer 12 from the ISDN network on channel 16 (the D channel) and thus the computer 12 is able to inform the computer 13 which slots belong to particular U-channels. As mentioned above, the slots are used in duplex fashion, but the numbering of the slots at one end is usually different from that at the other end. Thus each slot usually has a different number at one end than at the other.

FIGS. 5 and 6 illustrate how the slots in a U-channel may be delayed and their order changed between transmission and reception. The U-channel shown employs slots 4, 8 and 11 in the ISDN frame on transmission and octets are entered into these slots in the order given by the number 1 to 12 in FIG. 5 which relates to transmission. On reception this U-channel uses slots 3, 7 and 9 of the ISDN frame and the order in which the octets 1 to 11 are received is shown. Both FIGS. 5 and 6 are divided into four ISDN frames shown in the sequence of arrival so that in FIG. 6 it can be seen that the octets arrive in the order 2, 1, 5, 4, 8, 3, 7, 11.

The following information codes are stored by the receive portion 13b for each slot (1) Status—whether the slot is active, initialising or inactive. During initialisation codes indicating one of three states are also stored: (a) looking for the first synchronisation signal to appear in that U-channel, (b) waiting for the "far end synchronised" flag to be set in the received synchronisation signal, and (c) waiting for the "far-end sending data" flag to be set in the received synchronisation signal. A further status code (d) is used when a slot is to be deleted at the next correct time for synchronisation signals.

(2) The U-channel to which the slot is associated, (3) The skew offset for the slot; that is the frame in which the slot appears relative to a frame which is designated as "current", and (4) A synchronisation signal count for the slot. Although synchronisation signals are only sent when slots are being initiated, a count is kept of the number of times each slot is received so that the slot can be removed correctly from the U-channel when it is closed.

On reception, slots making up a complete frame are read one at a time and if they contain data the data is passed to the appropriate one of packet assembly buffers 184 to 185. The order in which the slots are read is not the order in which they appear in the receive frame but instead, the order in which the slots were transmitted, is used. Thus if data is transmitted in slots 3 and 5 and received in slots 20 and 2 respectively then slot 20 would be read before slot 2. The order in which the slots is read is stored by the receive portion 13b as a receive slot map which is entered in the order in which the slots were transmitted and provides, on exit, the ISDN slot in the receive frame which is to be read. This slot map is constructed in a way which is explained later in connection with FIG. 8, as is the way in which some of the information codes for each slot are obtained and stored. The frame store 182 holds five frames in order of reception. The third of these frames in order of reception is designated as the "current" frame so that the skew offset for a slot is determined relative to the current frame and stored as information code (3) for that slot. The offset is determined, as is explained later, when synchronisation signals are received. When data is being received the appropriate one of the five buffers in the frame store 182 is then read according to the offset to find the data for the slot being read.

The transputer 190 executes the operations given in the flow diagrams of FIGS. 7 and 8 once each time a frame is received. At the beginning an operation 50 is carried out to obtain the number of the first slot from the receive slot map. A test 51 then checks whether the slot is inactive and if not a test 52 checks whether the slot is initialised, both these tests being carried out on the stored information codes. If the slot is initialised then in an operation 57, the offset word for the slot is obtained from the appropriate frame in the store 182 using the information code (3). Next, a test 56 determines from a count kept for each packet assembly buffer 84 to 88 whether the data received is in the middle of a packet which is being received. In an operation 61 the offset word is transferred to the appropriate packet assembly buffer 184 to 188. A test 58 determines whether the packet i s complete by examining the packet count and if so a test 95 is carried out to determine if the packet received is an idle packet and if not the presence or absence of the special distinctive closing sequence in the received packet is detected by a test 93. If this sequence is detected the slot status is set to delete (code (d)) in the operation 94, but if not then the packet is sent from the appropriate one of the packet assembly buffers to the packet despatch buffer 189 in an operation 60.

If the test 56 shows that the data in the slot being examined is not in the middle of a packet then the word received is stored as the first word in a new packet in one of the packet assembly buffers 184 to 188 (operation 63).

If the test 52 shows that a slot is not initialised then operation is transferred to the flow chart of FIG. 8. First the stored information codes are read to determine whether the slot has status (a) (test 65). If so then the receive slot map is used to read the word in that slot from the "current" frame (operation 66). If this word is not a synchronisation signal as indicated by a test 67 then a return is made to FIG. 7 where an operation 64 which will be described later is carried out. Such a return to the operation 64 is made at all points in FIG. 8 where an "End" is shown. If the word received is a synchronisation signal then a test 70 determines whether this signal is in the first slot to be received in a U-channel. If so then the information code (3) for this slot is set to zero and the frame in which this slot occurs is set as the datum for calculating the offsets for other slots (operations 71 and 72). If the test 70 shows that the synchronisation signal received is not the first received in the associated U-channel then the offset between the datum frame and the current frame is calculated in operation 73 and stored as information code (3) for that slot. Following operation 72 or 73 the slot position is entered into the receive slot map (operation 74) and the processor 180 in the transmitter portion 13a is signalled (operation 75) to change the first flag in the synchronisation signals of the corresponding half of the duplex channel to indicate that synchronisation signals have been received. This change is carried out by test 46 and operation 47 of FIG. 2 and the updated synchronisation signal is sent in the operation 92. In operation 76 the information code relating to the status of this slot is changed to (b) and then test 77 is carried out to check the second flag in the synchronisation signal. If the flag is not set then there is a return to the operation 64 in FIG. 7 but if it is set then the slot status is changed to (c) (operation 78) and the transmission processor is signalled (operation 79) so that the second flag, indicating that data is about to be sent, can be set in the signals sent in the operation 92. In this case the transmitter starts sending data in the corresponding slot of the duplex link when it reaches the appropriate point in the flow diagrams of FIGS. 2 and 3.

Returning now to the test 65 at the start of FIG. 8, if the stored status indicates that the flag signals are awaited then a test 81 is carried out to determine whether synchronisation signals can occur in this slot at this time as indicated by the synchronisation signal count. If so a test 82 is used to indicate whether the status of the slot is (b); that is the receiver is waiting for the first flag (far end synchronised) to be set. If the slot has this status then the receive synchronisation signal is examined to see if the first flag is set (test 83) and if so then the stored information code of this slot is changed to (c) (operation 84) and the transmit processor is signalled in an operation 85 to indicate that the transmitter is to set the second flag (operations 47 and 33 of FIG. 2) and start sending data as determined by FIG. 3. Following the test 82 or the operation 85 a further test 86 checks whether the second flag is set in the received synchronisation signal for this slot and if so then the stored information code (1) is changed to indicate that the slot is active (operation 87).

Following either the end of initialisation as carried out by the flow chart of FIG. 8, or any of the operations 60, 94 and 93, a negative from the test 58 or an affirmative from the test 95, a test 53 examines the information code (4) to check whether this slot could contain synchronisation signals at this time as indicated by the synchronisation signal count. If synchronisation signals can occur then a test 54 and an operation 55 check whether the slot status is set to delete (code (d)) and if so, set the slot status (information code (1)) as inactive (operation 55).

Following the operation 55, or if the test 53 shows that synchronisation signals will not occur or the test 54 shows that the delete status is not set, an operation 64 is carried out to increase the receive synchronisation signal count (code 4) and then a test 68 is performed to determine whether the last slot in the slot map has been processed. If not then the number of the next slot to be examined is obtained from the slot map and a return is made to the test 51. Otherwise the frame scan is over and is repeated for another frame.

Examination of FIGS. 3, 4 and 7 shows that when a command to close a slot is given, the transmitting side at the end where the command is given causes the special closing sequence to be transmitted. When it is received and detected (the test 93 and the operation 94), the transmitter at the other end transmits the special sequence due to the test 46 and the operation 47, and when the sequence is received at the end where the command was given the receiver enters status code (d). Both receivers now have status code (d) and both transmitters status 5, and at the next time when synchronisation signals could occur the operation 32 changes the status of the transmitters to 1 and the operation 55 sets the status of the receivers to "inactive".

The number of packet assembly buffers is shown by way of example as five but in practice there is one such buffer for each U-channel and as mentioned above the number of U-channels can vary from 0 to 30.

Another embodiment of the invention is now described with reference to FIGS. 9, 10, 11 and 12. In FIG. 9 a PC 205 receives data from, for example, a local area network or a video codex. The resulting bit stream is to be transmitted by one or more U-channels over an ISDN with each U-channel formed by a group of ISDN slots. The PC 205 in conjunction with a microprocessor 202 sets up a number of control blocks in a dual port RAM 203 with one such block for each U-channel. Examples of these blocks are shown at 207 to 209 but in practice many more such blocks may be used. Information held by such a U-channel control block includes the destination of the U-channel, the number of ISDN slots required and the session number (that is a designation number for that U-channel). In addition each such block contains information designating six portions of the RAM 203, three of which form a transmit buffer for that U-channel and the other three forming a receive buffer. The transmit and receive buffers for the U-channel control block 207 are shown at 210a, 210b and 210c, and 211a, 211b and 211c, respectively.

The microprocessor 202 which may for example be an Intel 80960CA RISC processor, under the control of a program, preferably written in assembly language in order to give sufficient speed of operation for real time response (which is, of course, essential) and stored in an electrically programmable read-only memory (EPROM) 212 uses a RAM 213 for slot control in that it is used in controlling the transfer of data, in, in this embodiment, 8-bit octets, from the transmit buffers of the dual port RAM 203 to a transmit frame store 206. Each B slot in an ISDN frame is allocated a separate portion of the RAM 213.

A number of frames ready for ISDN transmission are held by the frame store 206 and they are read out in turn under the control of the microprocessor 202 using pointers to different frame locations in the store, the pointers being incremented each time a frame is read out. When all the frames in the store have been read out, pointer incrementation reverts to the beginning of the store so that frames are read out cyclically. The transmit frame store 206 is connected to commercially available ISDN circuits 200 which are connected to the ISDN network.

The same procedure of cycling through the frame store locations is carried out when data is transferred from the dual port RAM 203 to the frame store 206. Slots in a frame store location are filled at a point several frame locations behind the location being transmitted to the ISDN. The microprocessor 202 cycles through the portions for each slot of the RAM 213. Each of these portions contains data specifying the slot to be filled and a pointer to the appropriate U-channel control 207 to 209. This U-channel control contains data specifying a pointer to the next part of the buffer to be read out, for example part of the buffer 210a to 210c, so that the slot whose portion of the RAM 213 is used by the microprocessor 202 is filled by data from the appropriate buffer in the dual port RAM 203. When the buffer pointer in the U-channel control 207 reaches the end of one of the portions 210a, 210b and 210c, the control 207 signals the PC 205 to refill this portion with data. A wrap-round arrangement of pointers is used so that after the portion 210c has been read out to the transmit frame store 206 the next portion to be read out is the portion 210a, and these portions are filled in the same wrap-round cyclic fashion. The other transmit buffers are operated in the same way.

At times insufficient data may be received on a particular U-channel and although this could be considered as an error condition it is preferable to transmit a pattern that can be identified as not being data and can then be discarded on reception. A variation on a special closing packet, described below, is used for this purpose.

ISDN incoming signals having been processed by the ISDN circuits 200 are read into a receive frame store 204 under the control of a pointer which is incremented after each frame is read. Successive frames are entered into successive locations until the last location store is reached when the pointer is incremented to indicate the first location so that this store also is used in a wrap-round fashion.

The receive frame store 204 must be large enough to accommodate the greatest possible frame skew (N frames) which can occur due to different delays experienced in the ISDN by slots transmitted in the same ISDN frame. For this purpose the receive frame store 204 is sufficient to accommodate $2 \times N$ frames plus some additional margin for system latency (M frames).

Data is read from slots in the frame store at two points: a first point very near to the location where a frame has just been entered into the store as indicated by an incremented pointer and a second point, as indicated by a skew calculation described below, approximately half-way between the most recent and oldest frame held in the store. Data from the first point is used for the signals which are required for changing the number of slots in a U-channel while data from the second point is transferred under control of the contents of the RAM 213 to the receive buffers in the dual port RAM 203. In addition to its use for changing the number of slots in a U-channel the information supplied from the first location to the microprocessor is used to calculate skew.

As each slot is read out in the second position reference is made by the microprocessor 202 to the appropriate portion of the slot control RAM 213 which specifies which U-channel the slot belongs to and hence the U-channel control portion 207 to 209 which specifies the receive buffer to which data is to be transferred and the location in that buffer which is to receive data. In addition the slot control portion contains skew information so that data can be read from the correct frame location in the store 204. Additionally when a new slot is added to a U-channel information from, or just before, the second point is used to locate the arrival of the SYNC2 packet so that the start of received data can be located.

The operation of setting up the U-channels is first described briefly and then in more detail with reference to FIGS. 10, 11 and 12.

When off line, each slot of an ISDN transmits an idle data value (IDLE0) required by the ISDN service. When the local ISDN exchange has indicated to the circuits 200 that a slot connection has been made, equipment at each slot end proceeds to transmit a different value (IDLE1) and when equipment at an end receives the IDLE1 value, it alters its transmission to another value (IDLE2). Thus, when an end has received the IDLE2 value it is clear that the other end is receiving its transmission and it is receiving the transmission from the other end.

In this embodiment U-channels are opened and closed one slot at a time and when a new slot is to be opened a "packet" of data (SYNC1) is transmitted in the new slot after the IDLE2 value has been received. The SYNC1 packet consists of three initial arbitrary characters (chosen to be unlike the IDLE values, and unlike a SYNC2 packet, described below) followed by characters indicating the U-channel number, time order of slots within the U-channel at the transmitting end, the mode of communication employed, two further characters having no fixed significance at present and a checksum. In this embodiment of the invention the microprocessor 202 at each end stores each U-channel number so that when a new slot is added and the SYNC1 signal is received the new slot is recognised as potentially part of an existing U-channel. Various possible modes of communication allow for different delays in the reception of slots due to, for example, short or long haul connections (for instance by land line or satellite connection). The mode of communication may also indicate whether the data is packeted or transmitted as a continuous data stream and whether error correction is included.

Data synchronisation is achieved by the SYNC2 packet which consists of three initial characters unlike the IDLE values and SYNC1 followed by three characters carrying a time reference which is used to calculate the frame timing skew to allow for different delays experienced in the ISDN system by slots sent in the same transmit frame. The time reference value (TF) is followed by a checksum to validate it and then immediately in the next frame a data stream in the new slot as part of the U-channel which has just been joined by this slot.

Slots are also closed down one at a time and for this purpose a special 64-byte distinctive closing packet is sent, preferably, in this embodiment, in the slot to be closed. The microprocessor 202 is programmed to detect the special closing packet in any slot of a U-channel and this is carried out by bringing a subroutine into operation whenever a certain character which occurs at the beginning of the packet, usually a little used control character, is detected. If the packet starts with this special character and contains all the other characters of the closing packet then the slot in question is immediately deleted in the next frame from the U-channel so that no more data from this slot is included as part of the output of the U-channel. As an alternative the special closure packet can be sent in any part of the U-channel containing the slot to be closed when the number of the slot to be closed is sent after the closing packet.

When the apparatus of FIG. 9 first establishes connection to an ISDN, a frame counter forming part of the software for the microprocessor 202 is started and incremented each time an ISDN frame is received. The counter has a number of bits allowing a count value greater than the greatest possible frame skew. This number is preferably 32 bits but could be reduced to 16 bits in most circumstances. The counters of two different equipments of the type shown in FIG. 9 will almost always not have the same count value but whilst running they will always maintain precisely the same difference because they are both locked to the ISDN network clock.

As mentioned above a slot may experience more or less delay than other slots transmitted in the same U-channel in the same frame, due to having followed a different route through the ISDN. Thus slots transmitted in one frame may arrive in a spread of frames and it is necessary to calculate relative delay between frames so that U-channel data can be assembled in the correct order.

If the frame counters at a remote end and a local end of a slot have frame counts of RTF and LTF, respectively, then the difference between the counters (REF) is given by $$REF = RTF - LTF.$$

When SYNC2 is received for the first slot to be received in a U-channel, TF is read by the receiving slot end processor 202 and REF is calculated and stored. As SYNC2 arrives in slots received later, TF is extracted at the first reading point and stored as S_RTF when the value of the local frame counter is also stored as S_LTF.

In order to transfer data from the frame store 204 to the receive buffers of the dual port RAM 203, data is nominally read from the store 204 at a frame location which is a particular number of frames (approximately half the total number of frame locations) behind the location which has just been filled by received data from the ISDN. The frame location actually read depends on the skew for the slot being read and if the said particular number of frame locations corresponds to a nominal frame delay (NOM_FRAME_DELAY), then the location to be read is calculated from this value plus the difference between the times of transmission (S_RTF) and receipt (S_LIF) but allowance also has to be made for the difference between the remote and local frame counters (REF). Thus the position of the frame to be read in the store 204 relative to the frame location which has just been filled by the ISDN is calculated by the processor 20 for each slot in a U-channel as given by $$S\_FRAME\_DELAY = NOM\_FRAME\_DELAY - (REF - (S\_RTF - S\_LTF))$$

Once this offset has been calculated it is stored in the appropriate slot control location in the RAM 13 so that it can be used each time this RAM is traversed to read out a frame and transfer data to the appropriate U-channel buffers.

Although it may be decided at a calling end of a U-channel that the bit-rate should be changed by the addition or subtraction of a new slot, it may be that at the receive end circumstances are such that such a change in bit-rate cannot be accepted. This situation is taken into account in the flow diagram of FIG. 11 where the end which does not initiate the request for a new slot is able to accept or reject the request.

In the flow diagram of FIG. 10 operations carried out by the transmit procedure of the second embodiment of the system are shown. When the ISDN exchange has indicated that a slot connection has been made the transmit procedure of the system sends a predetermined number of IDLE1 signals and then a test 221 is carried out to determine whether the receiver coupled to the slot has received IDLE1 signals. If not the predetermined number of IDLE1 signals is transmitted again but if IDLE1 signals have been received then a predetermined number of IDLE2 signals is transmitted in an operation 222. Next, either a test 224 determines whether IDLE2 signals have been received on that slot, if, as indicated by a condition 218, the procedure is being carried out at the slot end initiating the new slot, or if not a test 219 indicates whether SYNC1 signals have been received and the call is accepted (see below). If neither test is positive a jump occurs back to operation 222 so that IDLE2 signals can be sent again but otherwise SYNC1 signals are transmitted (operation 225).

After a further test 226 to check that the new slot is still required, a test 227 is carried out by the transmitting procedure at the end of the slot at which the call was initiated as indicated by a condition 228. If the test 227 indicates that the SYNC1 signal has not been received then an IDLE2 signal is sent and a jump occurs back to the test 226 so that further IDLE2 signals continue to be sent until a SYNC1 signal is received, or if a slot is not accepted at the other end and SYNC1 signals are not sent for this reason (see below), the test 226 indicates that the slot is not required. At the end at which the new slot was not initiated (as indicated by the condition 228) a test 230 is carried out to determine whether the SYNC2 signal has been received and this signal is not transmitted from the other end until the SYNC1 signal has been received there. If not then the operation 229 to send an IDLE2 signal is carried out followed by a jump back to the test 226 so that IDLE2 signals continue to be sent until the SYNC2 signal is received.

When the SYNC1 signal is received at the end initiating the call or the SYNC2 signal is received at the other end then the SYNC2 signal is transmitted in an operation 231. Thus the end initiating the call sends SYNC2 when it receives SYNC1 which means that the other end has accepted the new slot, and the end not initiating sends SYNC2 when it receives SYNC2 from the other end. Data is now entered into the transmit frame store 206, in the way described above, as part of a U-channel in the next frame (operation 232) until no further data is to be sent by this particular slot when the special delete packet is sent (operation 234). It will be realised that the various signals IDLE1, IDLE2, SYNC1 and SYNC2 are entered into appropriate frames in the store 206 by the microprocessor 202. The procedure of FIG. 10 is terminated if, as indicated by the test 226, the new slot is no longer required.

The receive procedure of the flow chart of FIG. 11 begins with a test 236 to determine whether three IDLE1 signals have been received. This test is continuously carried out until such signals are received when a signal is sent to the transmit procedure indicating that the IDLE1 signals have been received (operation 237). The receive procedure then seeks three IDLE2 signals in a test 238 and when such signals are received at the end initiating the slot connection (as indicated by a condition 240), the transmit side is informed that the IDLE2 signals have been received (operation 241). Provided the new slot is still required (test 242) the receive side now seeks the arrival of the SYNC1 signal as indicated by a test 243. If this signal is not received it may be an indication that the non-initiating end will not accept the new slot (see a test 251 and an operation 252, described below, and the operation 225). If so then the result of the test 242 will become negative and a jump to the "END" will occur. Usually the SYNC1 signal will be received and then the transmit side is informed in an operation 244 and a test 245 is carried out to determine the arrival of a SYNC2 signal. After such a signal has been received data is taken from the slot as part of a U-channel in an operation 246 until a delete packet is received as indicated by a test 247.

Reverting to the condition 240, if the slot is not at the end initiating the slot, then a test 248 is carried out to detect the arrival of the SYNC1 signal when an operation 250 is used to inform a management process (operation 250). The management process may or may not be prepared to accept a further slot for an existing U-channel or a new U-channel. However, if it is decided to accept the new slot as indicated by a test 251 then the transmit side is informed that SYNC1 has been received in an operation 252. A test 253 is used to indicate the arrival of SYNC2 and when this occurs the transmit side is informed in an operation 254 and from the next frame on data is received in the slot as part of a U-channel (the operation 246) until a delete packet arrives as indicated by the test 247.

FIG. 12 is a flow diagram showing the operation 246 in more detail. When the first frame containing a newly opened slot is received in the receive frame store, an operation 255 is carried out to extract information at the first reading point for the slot control portions of the RAM 213, this information being contained by SYNC1 (U-channel number of the slot and time order of slots) and SYNC2 (TF). The microprocessor 202 then calculates the skew of that slot (operation 257) in the way described above from the frame count at the receiver at the time SYNC2 was read out, and the information extracted from SYNC1 and SYNC2, and the skew is stored in the appropriate portion of the RAM 213. Next data from the slot which is held by the receive buffer is read at the second reading point using the calculated skew (operation 258). The test 247 (also shown in FIG. 11) is then carried out and if the delete packet is not present a test 259 determines whether an IDLE packet is present. If not the data read is combined with data from other slots in the U-channel in the way described above using data in the RAM 213 and the control blocks 207 to 209. If the delete packet is present the transmit side is informed in an operation 261 when it also sends the delete packet in the next frame.

It will be clear that the invention can be put into operation in many different ways apart from those specifically described above. Clearly other synchronisation patterns and other configurations of computer hardware and algorithms can be used. The language used to implement the algorithms will depend on the type of computers and microprocessors used.

The invention may be used with any bit-synchronised digital data network not simply an ISDN as specifically described. Suitable networks are not necessarily time multiplexed and subordinate signals may be transmitted on channels in any order.

We claim:

1. A method of varying the bit-rate available for digital signals to be transmitted by a communication system which employs a plurality of first channels which in operation always have the same fixed bit-rate, comprising the steps of opening for operation between two stations a variable bit-rate second channel comprising at least one of the first channels, where each of the first channels have equal bit-rates, and changing, as required in the course of operation, the number of first channels comprising the second channel while continuing to transmit data over the second channel, wherein the number of first channels forming the second channel is reduced, when required, by transmitting, in the second channel, a predetermined distinctive sequence of digital signals from one of the two stations, the predetermined distinctive sequence being one which is not likely to occur in data to be transmitted by the communication system, ceasing to transmit data in one of the first channels which is to be removed from the second channel at a time having a first predetermined relationship to the transmission of the predetermined distinctive sequence, and at the said other station, omitting, at a time having a second predetermined relationship to the reception of the predetermined distinctive sequence, any data received in the said one first channel from the output of the second channel.

2. A method according to claim 1 wherein the first channels and the second channel are duplex channels.

3. A method of varying the bit-rate available for digital signals to be transmitted by a communication system which employs a plurality of first fixed bit-rate channels, comprising the steps of opening for operation between two stations a variable bit-rate second channel comprising at least one of the first channels, and changing, as required in the course of operation, the number of first channels comprising the second channel while continuing to transmit data over the second channel, wherein the number of first channels forming the second channel is reduced, when required, by transmitting, in the second channel, a predetermined distinctive sequence of digital signals from one of the two stations, the predetermined distinctive sequence being one which is not likely to occur in data to be transmitted by the communication system, ceasing to transmit data in one of the first channels which is to be removed from the second channel at a time having a first predetermined relationship to the transmission of the predetermined distinctive sequence, and at the said other station, omitting, at a time having a second predetermined relationship to the reception of the predetermined distinctive sequence, any data received in the said one first channel from the output of the second channel, wherein opening a variable bit-rate second channel or increasing the number of first channels in the second channel comprises the steps of transmitting a first further predetermined sequence of digital signals from both stations in one of the first channels which is carrying a second predetermined sequence of digital signals indicating that the channel is idle, detecting separately at each station the reception of the first further predetermined sequence of digital signals and then transmitting a third further predetermined sequence of digital signals separately at each station followed by digital signals representing data, and combining the digital signals received after the third further sequence with digital signals received in all other first channels already forming the second channel to provide an output for the second channel.

4. A method according to claim 3 wherein the first channels are the sub-channels of an ISDN system and the first channels are transmitted in a series of frames.

5. A method according to claim 4 including defining a series of synchronisation times at each station which are separated from one another by the same number of frames, wherein the said first and third predetermined sequences of digital signals are only transmitted at synchronisation times, and detection of the said first and third predetermined sequences, on reception, only takes place at synchronisation times.

6. A method according to claim 4 comprising the further step of opening a further second channel, wherein the said sequences of digital signals are transmitted at any time, the third further sequence is followed by data signals indicating to which of said second channels the first channel being opened belongs, the third further sequence is followed when the first channel is ready for data signals in both directions by a fourth further predetermined sequence of data signals followed by data signals indicating the time of transmission thereof, the fourth sequence being followed in the next frame by data signals representing traffic to be sent by the second channel, and detection of the said sequences is carried out by examining every first channel in each second channel in each frame for at least one of the said sequences.

7. A method according to claim 4 including defining a series of synchronisation times which are separated from one another by the same number of frames, and when the said one channel is to be removed from the second channel, ceasing to combine data from the said one channel at the frame following the next synchronisation time after reception of the predetermined distinctive sequence.

8. A method according to claim 7 including, when the said one channel is to be removed, ceasing to transmit data in the said one channel at the frame following the next synchronisation time after reception of the predetermined distinctive sequence.

9. A method according to claim 4 wherein when a command is given to remove the said one channel from the second channel the predetermined distinctive sequence is sent in the next frame after receiving the command, data ceases to be transmitted in the said one channel in the said next frame, every first channel in the second channel is examined on reception in each frame to determine whether the predetermined distinctive sequence is present, and data received in the said one channel is omitted from the output of the second channel in the next frame following that in which the predetermined distinctive sequence is received.

10. A method according to claim 1 wherein the predetermined distinctive sequence has at least 48 bits.

11. A method according to claim 4 wherein the predetermined distinctive sequence is part of a 64-bit sequence which also includes an identification of the said one first channel.

12. Apparatus for use in transmitting and receiving variable bit-rate digital signals, comprising means for operating a plurality of fixed bit-rate first duplex channels, each of which first channels have the same bit-rate, at a first location for communication to a second location, means for combining a variable number of the first channels to provide a variable bit-rate second channel, and means for changing the number of first channels forming the second channel as required in the course of operation while continuing to transmit data over the second channel, comprising means for transmitting a predetermined distinctive sequence of digital signals from the first location when the number of first channels forming a second channel is to be reduced, the predetermined distinctive sequence being one which is not likely to occur in data to be transmitted by the second channel, and means for detecting the predetermined distinctive sequence when transmitted from the second location and received at the first location, the means for combining the first channels being arranged to cease to transmit data in one of the first channels which is to be removed from the second channel at a time having a first predetermined relationship to the transmission of the predetermined distinctive sequence and to omit, at a time having a second predetermined relationship to the reception of the predetermined distinctive sequence, any data received in the said one first channel from the output of the second channel.

13. Apparatus according to claim 12 wherein the means for operating the first channels comprises multiplex means for time division multiplexing a high bit-rate channel to provide the first channels, the first channels then being transmitted in a series of frames.

14. Apparatus for use in transmitting and receiving variable bit-rate digital signals, comprising means for operating a plurality of fixed bit-rate first duplex channels at a first location for communication to a second location, means for combining a variable number of the first channels to provide a variable bit-rate second channel, and means for changing the number of first channels forming the second channel as required in the course of operation while continuing to transmit data over the second channel, comprising means for transmitting a predetermined distinctive sequence of digital signals from the first location when the number of first channels forming a second channel is to be reduced, the predetermined distinctive sequence being one which is not likely to occur in data to be transmitted by the second channel, and means for detecting the predetermined distinctive sequence when transmitted from the second location and received at the first location, the means for combining the first channels being arranged to cease to transmit data in one of the first channels which is to be removed from the second channel at a time having a first predetermined relationship to the transmission of the predetermined distinctive sequence and to omit, at a time having a second predetermined relationship to the reception of the predetermined distinctive sequence, any data received in the said one first channel from the output of the second channel, wherein the means for operating the first channels comprises multiplex means for time division multiplexing a high bit-rate channel to provide the first channels, the first channels then being transmitted in a series of frames, and further comprising means for defining a series of synchronisation times which are separated from one another by the same number of frames, and wherein the means for changing the number of first channels is arranged to cease combining data from the said one channel at the frame following the next synchronisation time after reception of the predetermined distinctive sequence.

15. Apparatus according to claim 14 wherein the means for changing the number of first channels is arranged to cease transmitting data in the said one first channel at the frame following the next synchronisation time after reception of the predetermined distinctive sequence.

16. Apparatus according to claim 15 wherein the means for changing the number of first channels is arranged to send the predetermined distinctive sequence in any frame and to cease transmitting data in one of the first channels in the next frame, the means for detecting the predetermined distinctive sequence is arranged to examine every first channel in the second channel in each frame to determine whether the predetermined distinctive sequence is present, and the means for changing the number of first channels is arranged to omit, from the output of the second channel, data received in the said one first channel in the next frame following that in which the predetermined distinctive sequence is received.

17. Apparatus according to claim 12 wherein the means for changing the number of first channels, in operation, transmits the said predetermined distinctive sequence as a sequence of at least 48 bits.

18. Apparatus according to claim 17 wherein the means for changing the number of first channels, in operation, transmits the predetermined distinctive sequence as part of a 64-bit sequence which also includes an identification of a first channel which is to be closed.

* * * * *